(12) United States Patent
Kuriyama et al.

(10) Patent No.: US 11,843,429 B2
(45) Date of Patent: Dec. 12, 2023

(54) WIRELESS COMMUNICATION SYSTEM, WIRELESS COMMUNICATION METHOD, TRANSMITTING STATION DEVICE AND RECEIVING STATION DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP); Masafumi Yoshioka, Musashino (JP); Tsutomu Tatsuta, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 177 days.

(21) Appl. No.: 17/602,152

(22) PCT Filed: Mar. 26, 2020

(86) PCT No.: PCT/JP2020/013837
§ 371 (c)(1),
(2) Date: Oct. 7, 2021

(87) PCT Pub. No.: WO2020/209093
PCT Pub. Date: Oct. 15, 2020

(65) Prior Publication Data
US 2022/0209830 A1 Jun. 30, 2022

(30) Foreign Application Priority Data

Apr. 11, 2019 (JP) ................................. 2019-075561

(51) Int. Cl.
*H04B 7/02* (2018.01)
*H04B 7/0456* (2017.01)

(52) U.S. Cl.
CPC .................. *H04B 7/0456* (2013.01)

(58) Field of Classification Search
CPC ....... H04B 7/0456; H04B 7/0854; H04B 3/04
(Continued)

(56) References Cited

U.S. PATENT DOCUMENTS

| 10,785,071 | B2* | 9/2020 | Nakajima | ........... H04L 27/2607 |
| 2013/0177064 | A1* | 7/2013 | Ido | ..................... H03M 13/4107 |
| | | | | 375/232 |
| 2020/0099428 | A1* | 3/2020 | Ciochina | .............. H04B 7/0617 |

FOREIGN PATENT DOCUMENTS

| JP | 2007-214994 A | 8/2007 |
| JP | 2017-069688 A | 4/2017 |

OTHER PUBLICATIONS

Kuriyama Keita, Fukuzono Hayato, Yoshioka Masafumi, Tatsuta Tsutomu, "FIR-type Transmit Beamforming for Wide-band Single Carrier MIMO Transmission", IEICE technical report, vol. 118, No. 435, RCS2018-247, pp. 31-36, Jan. 2019.
(Continued)

*Primary Examiner* — Helene E Tayong
(74) *Attorney, Agent, or Firm* — Harness, Dickey & Pierce, P.L.C.

(57) ABSTRACT

According to the present invention, in a wireless communication system that performs single carrier MIMO transmission between a transmitting station device and a receiving station device, the transmitting station device including: a time-domain linear equalization unit configured to remove inter-symbol interference and inter-stream interference from a data signal to be transmitted to the receiving station device; a propagation path characteristics estimation unit configured to receive a training signal which is transmitted by the receiving station device and estimate a transfer function matrix of propagation path characteristics; and a filter tap calculation unit configured to calculate filter tap coefficients
(Continued)

for the time-domain linear equalization unit by representing the estimated transfer function matrix as a matrix polynomial, taking an inverse response of the matrix polynomial as a transmit weight matrix, and approximating the transmit weight matrix with Neumann series, and the receiving station device including a training signal generation unit configured to generate the training signal for use in estimation of propagation path characteristics and transmit it to the transmitting station device.

6 Claims, 6 Drawing Sheets

(58) Field of Classification Search
USPC .......................................................... 375/267
See application file for complete search history.

(56) References Cited

OTHER PUBLICATIONS

Ishii, Ryu et al. Complexity and Transmission Rate Evaluations for Linear Precoding by Using Neumann Series Aided Inverse Matrix Approximation over Massive MIMO. IEICE Technical Report, Feb. 27, 2019, vol. 118, No. 474, pp. 151-156, ISSN 2432-6380.
Zhang, Yaping et al., Expectation Propagation Detection with Neumann-Series Approximation for Massive MIMO, 2018 IEEE International Workshop on Signal Processing Systems (SiPS), Jan. 3, 2018(Jan. 3, 2018), pp. 59-64, ISSN 2374-7390.
International Search Report issued in PCT/JP2020/013837, dated Jun. 23, 2020; ISA/JP.

* cited by examiner

WIRELESS COMMUNICATION SYSTEM, WIRELESS COMMUNICATION METHOD, TRANSMITTING STATION DEVICE AND RECEIVING STATION DEVICE

CROSS-REFERENCE TO RELATED APPLICATIONS

This application is a 371 U.S. National Phase of International Application No. PCT/JP2020/013837 filed on Mar. 26, 2020, which claims priority to Japanese Application No. 2019-075561 filed on Apr. 11, 2019. The entire disclosures of the above applications are incorporated herein by reference.

TECHNICAL FIELD

The present invention relates to techniques for performing transmit beam forming with a time-domain linear equalizer in a wireless communication system that performs wide-band single carrier MIMO (SC-MIMO (Single Carrier Multiple-Input Multiple-Output)) transmission in a communication environment with frequency selective fading.

BACKGROUND ART

When wide-band SC-MIMO transmission is performed in a communication environment with frequency selective fading, it is necessary to remove inter-symbol interference caused by temporal spread of communication path characteristics and inter-stream interference caused by spatial spread of multiple antennas. To that end, there has been study on an approach to removing inter-symbol interference and inter-stream interference simultaneously by performing transmit beam forming in time/space directions using a time-domain linear equalizer of FIR (finite impulse response) type (an FIR filter) (see Non-Patent Literature 1, for instance). In transmit beam forming with an FIR filter, a time-domain linear equalizer is constructed using an inverse matrix of a transfer function matrix of propagation path characteristics (CIR (channel impulse response)) resulting from channel estimation as a transmit weight matrix and respective elements of the transmit weight matrix as filter tap coefficients.

CITATION LIST

Non-Patent Literature

Non-Patent Literature 1: Kuriyama Keita, Fukuzono Hayato, Yoshioka Masafumi, Tatsuta Tsutomu, "FIR-type Transmit Beamforming for Wide-band Single Carrier MIMG Transmission", IEICE technical report, vol. 118, no. 435, RCS2018-247, pp. 31-36, January 2019.

SUMMARY OF THE INVENTION

Technical Problem

Here, in the conventional technique above, an inverse matrix $H^{-1}(z)$ of a transfer function matrix $H(z)$ is computed as a transmit weight matrix $W(z)$ as shown in Expression (1).

[Math. 1]

$$W(z) = H^{-1}(z) \\ = \frac{1}{\det(H(z))} adj(H(z)) \quad (1)$$

In Expression (1), the transmit weight matrix $W(z)$ can be expressed by the product of transfer functions of $1/\det(H(z))$ and a matrix of $adj(H(z))$. Note that $\det(\cdot)$ and $adj(\cdot)$ represent a determinant and an adjugate matrix, respectively. The adj is different from an adjoint matrix representing Hermitian transposition.

A method that uses the inverse matrix of the transfer function matrix $H(z)$ for CIR as the transfer functions for a linear equalizer has a problem of the transmit weight matrix $W(z)$ diverging when the determinant $\det(H(z))$ of the transfer function matrix is in a non-minimum phase, making it impossible to remove inter-symbol interference and inter-stream interference with a time-domain linear equalizer.

FIG. 6 shows an example of filter tap coefficients when det (Hz) is in the minimum phase versus in a non-minimum phase. In FIG. 6, the horizontal axis indicates time corresponding to delay taps ($Z^{-0}$, $Z^{-1}$, $Z^{-2}$ ...) of an FIR filter, and the vertical axis indicates complex gain corresponding to the filter tap coefficient for each delay tap. FIG. 6(a) shows complex gain for each delay tap when $\det(H(z))$ is in the minimum phase, while FIG. 6(b) shows complex gain for each delay tap when $\det(H(z))$ is in a non-minimum phase.

In FIG. 6(a), when $\det(H(z))$ is in the minimum phase, the complex gain of the delay tap gradually decreases to converge, so that operation is stable and implementation of an equalizer with an FIR filter is possible. By contrast, in FIG. 6(b), when $\det(H(z))$ is in a non-minimum phase, the complex gain of the delay tap gradually increases to diverge, so that the operation becomes unstable and implementation with a time-domain linear equalizer such as an FIR filter is difficult.

The present invention is aimed at providing a wireless communication system, a wireless communication method, a transmitting station device and a receiving station device that can remove inter-symbol interference and inter-stream interference with a time-domain linear equalizer by using a computation scheme for computing a non-diverging transmit weight matrix even when the determinant of the transfer function matrix $H(z)$ for CIR is in a non-minimum phase in SC-MIMO transmission.

Means for Solving the Problem

A first aspect of the present invention is a wireless communication system that performs single carrier MIMO transmission between a transmitting station device and a receiving station device, the transmitting station device including: a time-domain linear equalization unit configured to remove inter-symbol interference and inter-stream interference from a data signal to be transmitted to the receiving station device; a propagation path characteristics estimation unit configured to receive a training signal which is transmitted by the receiving station device and estimate a transfer function matrix of propagation path characteristics; and a filter tap calculation unit configured to calculate filter tap coefficients for the time-domain linear equalization unit by representing the estimated transfer function matrix as a matrix polynomial, taking an inverse response of the matrix polynomial as a transmit weight matrix, and approximating the transmit weight matrix with Neumann series, and the receiving station device including: a training signal generation unit configured to generate the training signal for use in estimation of propagation path characteristics and transmit the training signal to the transmitting station device.

A second aspect of the present invention is the first aspect, in which the transmitting station device further includes a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

A third aspect of the present invention is a wireless communication system that performs single carrier MIMO transmission between a transmitting station device and a receiving station device, the transmitting station device including: a time-domain linear equalization unit configured to remove inter-symbol interference and inter-stream interference from a data signal to be transmitted to the receiving station device; and a training signal generation unit configured to generate a training signal for use in estimation of propagation path characteristics and transmit the training signal to the receiving station device, and the receiving station device including: a propagation path characteristics estimation unit configured to receive the training signal transmitted by the transmitting station device and estimate a transfer function matrix of propagation path characteristics; and a filter tap calculation unit configured to calculate filter tap coefficients for the time-domain linear equalization unit by representing the estimated transfer function matrix as a matrix polynomial, taking an inverse response of the matrix polynomial as a transmit weight matrix, and approximating the transmit weight matrix with Neumann series, and to transmit the filter tap coefficients to the transmitting station device.

A fourth aspect of the present invention is the third aspect, in which the receiving station device further includes a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

A fifth aspect of the present invention is a wireless communication method in a wireless communication system that performs single carrier MIMO transmission between a transmitting station device and a receiving station device, the transmitting station device performing: time-domain linear equalization processing for removing inter-symbol interference and inter-stream interference from a data signal to be transmitted to the receiving station device; propagation path characteristics estimation processing for receiving a training signal which is transmitted by the receiving station device and estimating a transfer function matrix of propagation path characteristics; and filter tap calculation processing for calculating filter tap coefficients for the time-domain linear equalization processing by representing the estimated transfer function matrix as a matrix polynomial, taking an inverse response of the matrix polynomial as a transmit weight matrix, and approximating the transmit weight matrix with Neumann series, and the receiving station device performing training signal generation processing for generating the training signal for use in estimation of propagation path characteristics and transmitting the training signal to the transmitting station device.

A sixth aspect of the present invention is the fifth aspect, in which the transmitting station device further performs weight computation scheme determination processing for assessing a condition on whether approximation of the transmit weight matrix with the Neumann series is possible or not, and when the condition is not met, for making the filter tap calculation processing calculate the filter tap coefficients by a different method than approximation with the Neumann series.

A seventh aspect of the present invention is a transmitting station device that performs single carrier MIMO transmission with a receiving station device, the transmitting station device including: a time-domain linear equalization unit configured to remove inter-symbol interference and inter-stream interference from a data signal to be transmitted to the receiving station device; a propagation path characteristics estimation unit configured to receive a training signal which is transmitted by the receiving station device and estimate a transfer function matrix of propagation path characteristics; and a filter tap calculation unit configured to calculate filter tap coefficients for the time-domain linear equalization unit by representing the estimated transfer function matrix as a matrix polynomial, taking an inverse response of the matrix polynomial as a transmit weight matrix, and approximating the transmit weight matrix with Neumann series, and a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

An eighth aspect of the present invention is a receiving station device that performs single carrier MIMO transmission with a transmitting station device, the receiving station device including: a propagation path characteristics estimation unit configured to receive a training signal which is transmitted by the transmitting station device and estimate a transfer function matrix of propagation path characteristics; a filter tap calculation unit configured to calculate filter tap coefficients for a time-domain linear equalization unit on the transmitting station device side by representing the estimated transfer function matrix as a matrix polynomial, taking an inverse response of the matrix polynomial as a transmit weight matrix, and approximating the transmit weight matrix with Neumann series, and to transmit the filter tap coefficients to the transmitting station device, the time-domain linear equalization unit removing inter-symbol interference and inter-stream interference on a propagation path; and a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

Effects of the Invention

The wireless communication system, the wireless communication method, the transmitting station device and the receiving station device according to the present invention can remove inter-symbol interference and inter-stream interference with a time-domain linear equalizer by using a computation scheme for computing a non-diverging transmit weight matrix even when the determinant of the transfer function matrix H(z) for CIR is in a non-minimum phase in SC-MIMO transmission.

DESCRIPTION OF EMBODIMENTS

Embodiments of the wireless communication system, wireless communication method, the transmitting station device and the receiving station device according to the present invention are described below with reference to drawings.

Figure 1:
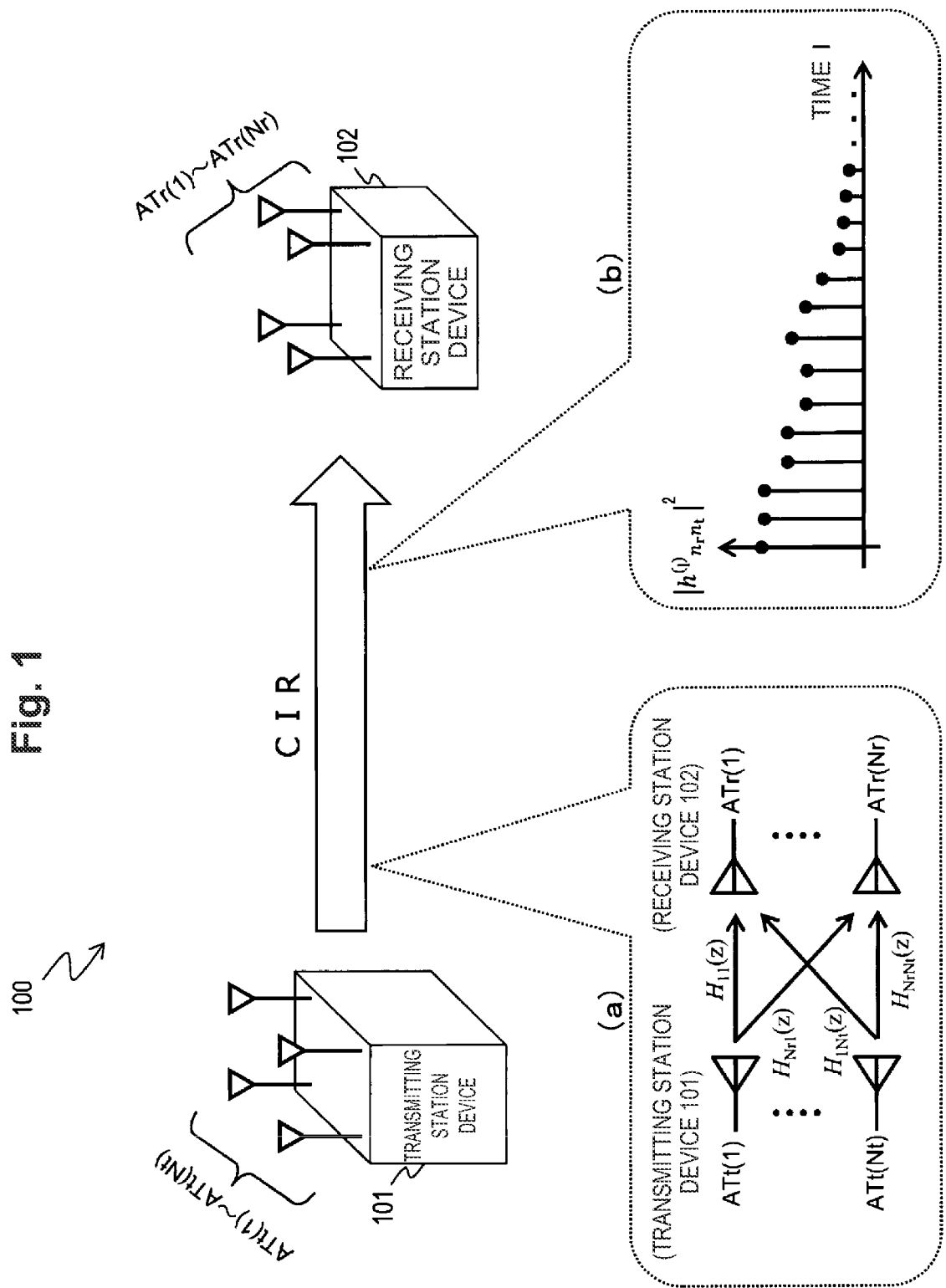
FIG. 1 shows an example of overall configuration of a wireless communication system in various embodiments.

FIG. 1 shows an example of overall configuration of a wireless communication system 100, which is common to various embodiments. In FIG. 1, the wireless communication system 100 includes a transmitting station device 101 and a receiving station device 102 and performs wireless communication between the transmitting station device 101 and the receiving station device 102. The transmitting station device 101 has multiple ($N_T$, an integer $N_T \geq 2$) antennas from an antenna ATt(1) through an antenna ATt($N_T$). The receiving station device 102 has multiple ($N_R$, an integer $N_R \geq 2$) antennas from an antenna ATr(1) through an antenna ATr($N_R$). In the following description, for discussion common to the antenna ATt(1) through the antenna ATt($N_T$) of the transmitting station device 101, they are indicated as antenna ATt omitting "(number)" at the end of their reference signs, and are indicated as antenna ATt(1), for example, with addition of "(number)" at the end of the reference sign when a specific antenna is referred to. The antenna ATr(1) through the antenna ATr($N_R$) of the receiving station device 102 are also indicated in a similar manner. Also, multiple same blocks, if provided, are indicated in a similar manner.

The wireless communication system 100 according to the present embodiment performs wireless communication of wide-band SC-MIMO scheme using multiple antennas between the transmitting station device 101 and the receiving station device 102. As shown in FIG. 1(a), inter-stream interference due to spatial spread occurs between the $N_T$ antennas of the transmitting station device 101 and the $N_R$ antennas of the receiving station device 102. Also, signals transmitted and received between the respective antennas of the transmitting station device 101 and the receiving station device 102 undergo frequency selective fading due to multiple delayed waves with different delay times such as multipath, giving rise to inter-symbol interference due to temporal spread such as shown in FIG. 1(b). Thus, inter-stream interference and inter-symbol interference need to be suppressed in the wireless communication system 100.

Here, the CIR of a wireless communication path between the transmitting station device 101 and the receiving station device 102 can be represented by a matrix of transfer functions (referred to as a transfer function matrix) H(z), which has $N_T \times N_R$ elements according to the number of multiple antennas. Expression (2) represents a transfer function matrix H(z) for N×N MIMO, where $N_R = N_T$ (=N), and H(z) is an Nth-order polynomial matrix.

[Math. 2]

$$H(z) = \begin{bmatrix} H_{11}(z) & \cdots & H_{1N}(z) \\ \vdots & \ddots & \vdots \\ H_{N1}(z) & \cdots & H_{NN}(z) \end{bmatrix} \quad (2)$$

In Expression (2), a transfer function $H_{ij}(z)$ at each element of the transfer function matrix H(z) is represented by Expression (3). The transfer function $H_{ij}(z)$ is an Lth-order polynomial.

[Math. 3]

$$H_{ij}(z) = \sum_{l=0}^{L-1} h_{ij}^{(l)} z^{-l} \quad (3)$$

Here, i is an integer $1 \leq i \leq N$, and j is an integer $1 \leq j \leq N$. Also, $H^{(1)}_{ij}$ indicates the CIR for the l-th path between the i-th receive antenna and the j-th transmit antenna. L is CIR length (equivalent to the number of paths a signal propagates through), and $z^{-1}$ is a delay operator for the transfer function.

Then, by constructing a linear equalization unit with an inverse matrix $H^{-1}(z)$ of the transfer function matrix H(z) as the transmit weight matrix W(z), inter-symbol interference and inter-stream interference can be removed simultaneously.

Figure 2:
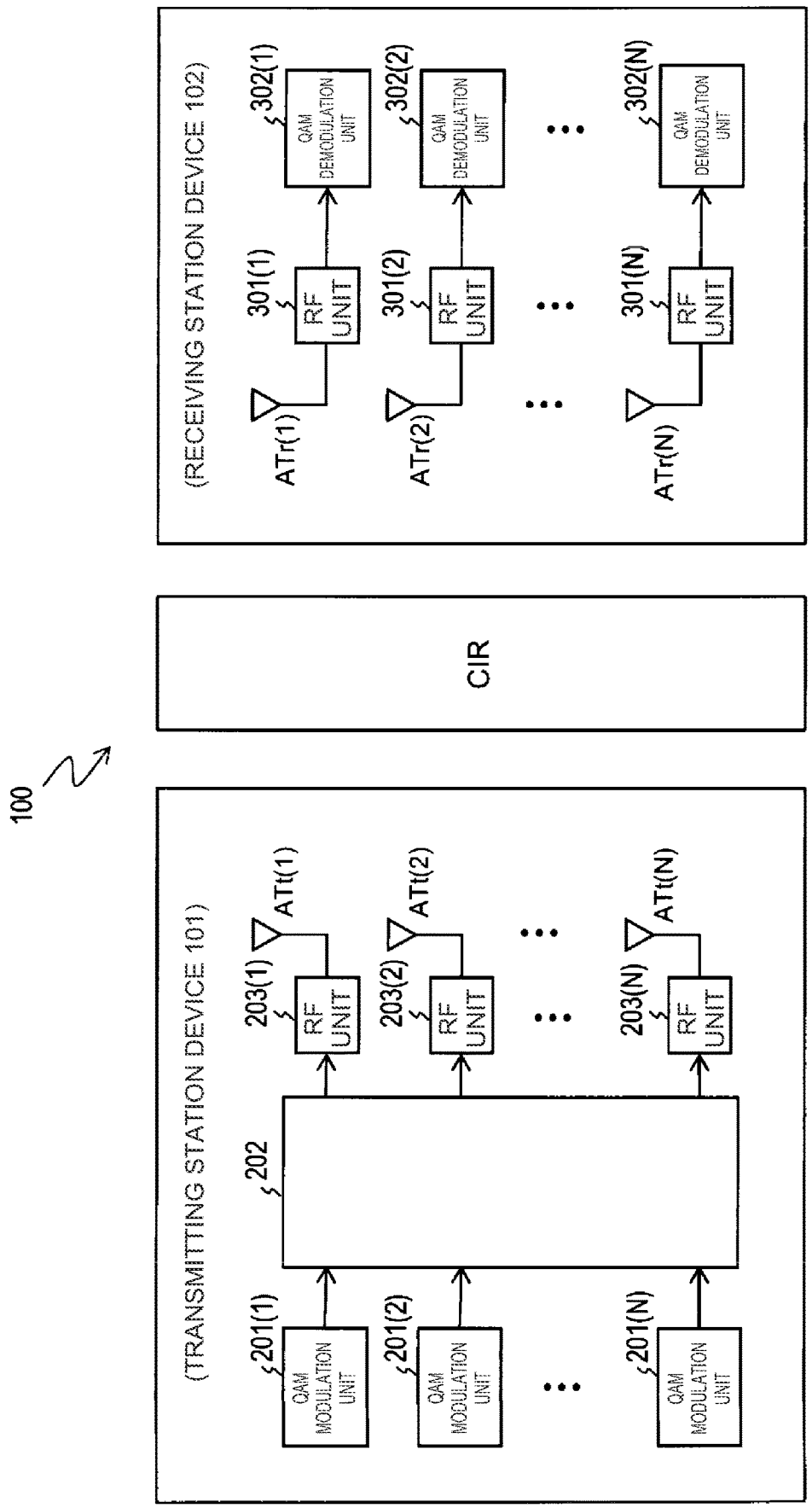
FIG. 2 shows an example of a transmitting station device and a receiving station device.

FIG. 2 shows an example of the transmitting station device 101 and the receiving station device 102. In FIG. 2, the transmitting station device 101 includes a QAM modulation unit 201, a linear equalization unit 202, an RF unit 203, and antennas ATt.

The QAM modulation unit 201 outputs a data signal S(n), generated by quadrature amplitude modulation (QAM) of a bit string of data information bits which are to be transmitted to the receiving station device 102. The QAM modulation unit 201 has a QAM modulation unit 201(1) through a QAM modulation unit 201(N) and outputs data signals corresponding to N streams.

The linear equalization unit 202 performs a time-domain linear equalization processing for inter-symbol interference and inter-stream interference with the transmit weight matrix W(z) computed based on the CIR between the transmitting station device 101 and the receiving station device 102. How to compute the transmit weight matrix W(z) is described in detail later. At the same time with the equalization processing, processing for normalizing transmission power is also performed.

The RF unit 203 has N RF units: an RF unit 203(1) through an RF unit 203(N) corresponding to the N antennas ATt respectively, and frequency-converts a signal outputted by the linear equalization unit 202 into a transmit signal of a high frequency and sends it from each antenna ATt for each stream.

The antennas ATt include N antennas: the antenna ATt(1) through antenna the ATt(N), and radiates the high-frequency signal for each stream outputted by the RF unit 203 into space as an electromagnetic wave.

In this manner, the transmitting station device 101 can transmit signals from which inter-symbol interference and inter-stream interference have been removed by the linear equalization unit 202 to the receiving station device 102.

In FIG. 2, the receiving station device 102 includes the antennas ATr, an RF unit 301 and a QAM demodulation unit 302.

The antennas ATr include N antennas for transmission and reception: the antenna ATr(1) through the antenna ATr(N), and converts an electromagnetic wave in space transmitted from the transmitting station device 101 into a high-frequency signal.

The RF unit 301 has N RF units: an RF unit 301(1) through an RF unit 301(N) respectively corresponding to the N antennas ATr, and frequency-converts the respective high-frequency signals outputted by the antenna ATr(1) through the antenna ATr(N) into baseband data signals.

The QAM demodulation unit 302 demodulates data signals $S\wedge(n)$ for N streams outputted by the RF unit 301 into information bits and outputs a bit string. Since the RF unit 301 outputs data signals $S\wedge(n)$ for N streams according to the number of antennas ATr, the QAM demodulation unit 302 demodulates the data signal $S\wedge(n)$ for each stream.

In this manner, the receiving station device 102 can receive signals from which inter-symbol interference and inter-stream interference have been removed on the transmitting station device 101 side and demodulate the data signals.

In FIG. 2, when representing the data signal outputted by the QAM modulation unit 201 as S(n), the transmit weight matrix of the linear equalization unit 202 as W(Z), the transfer function matrix for CIR as H(z), the data signal outputted by the RF unit 301 as $S\wedge(n)$, and additive noise as η(n), relationship of a signal transmitted/received in the wireless communication system 100 according to the present embodiment can be represented by Expression (4):

[Math. 4]

$$\hat{S}(n) = H(z)W(z)S(n) + \eta(n) \quad (4)$$

(Method of Computing the Transmit Weight Matrix W(z))

Next, how to compute the transmit weight matrix W(z) is described. When the number of antennas of the transmitting station device 101 and the receiving station device 102 is N (N being a positive integer), the transfer function matrix H(z) of CIR for N×N MIMO transmission can be decomposed into an Lth-order matrix polynomial as in Expression (5), where L is the number of paths (L being a positive integer) and l is path number. Here, z indicates a delay operator and $H^{(l)}$ indicates the transfer function matrix for the l-th path.

[Math. 5]

$$H(z) = \sum_{l=0}^{L-1} z^{-l} H^{(l)} \quad (5)$$

Here, the transfer function matrix $H^{(L)}$ for the l-th path will be an N×N Nth-order square matrix and can be represented by Expression (6).

[Math. 6]

$$H^{(l)} = \begin{bmatrix} h_{11}^{(l)} & \cdots & h_{1N}^{(l)} \\ \vdots & \ddots & \vdots \\ h_{N1}^{(l)} & \cdots & h_{NN}^{(l)} \end{bmatrix} \quad (6)$$

The transmit weight matrix W(z) used in the linear equalizer of the transmitting station device 101 can be represented by Expression (7) as an inverse response of the transfer function matrix H(z) shown by Expression (5).

[Math. 7]

$$W(z) = \left( \sum_{l=0}^{L-1} z^{-l} H^{(l)} \right)^{-1} \quad (7)$$

Then, Expression (7) is transformed into Expression (8) in order to make the respective elements of the transmit weight matrix W(z) filter tap coefficients for the time-domain linear equalizer.

[Math. 8]

$$W(z) = \left( I + \sum_{l=1}^{L-1} z^{-l} H^{(0)-1} H^{(l)} \right)^{-1} H^{(0)-1} \quad (8)$$

Here, the expression transformation with Neumann series shown in Expression (9) is used.

[Math. 9]

$$(I - A)^{-1} = I + A + A^2 + \cdots$$
$$= \sum_{k=0}^{\infty} A^k \quad (9)$$

Applying Expression (9) to Expression (8), the transmit weight matrix W(z) can be transformed as in Expression (10).

[Math. 10]

$$W(z) = \sum_{k=0}^{\infty} \left( -\sum_{l=1}^{L-1} z^{-l} H^{(0)-1} H^{(l)} \right)^k H^{(0)-1} \quad (10)$$

Here, since the FIR filter constituting the time-domain linear equalizer terminates calculation at a finite number of taps M (M being a positive integer), the transmit weight matrix W(z) is represented by Expression (11). The value k is an integer, 0≤k≤M−1.

[Math. 11]

$$W(z) = \sum_{k=0}^{M-1} \left( -\sum_{l=1}^{L-1} z^{-l} H^{(0)-1} H^{(l)} \right)^k H^{(0)-1} \quad (11)$$

In this manner, the transfer function matrix of CIR in N×N MIMO transmission is decomposed into a matrix polynomial having z as a variable, and the transmit weight matrix W(z) is determined using the inverse response of the transfer function represented by that matrix polynomial. Thus, an FIR filter having the respective elements of W(z) as filter tap coefficients can be used for implementation.

Here, an application condition for determining the inverse matrix of the transfer function matrix H(z) from expression transformation with the Neumann series is as follows.

Approximation with the Neumann series is conditioned on satisfying the following for l=(1, . . . , L−1.

[Math. 12]

The operator norm $\|H^{(0)-1}H^{(1)}\|_p$ of $H^{(0)-1}H^{(1)}$ is $\|H^{(0)-1}H^{(1)}\|_p < 1$ (Condition 1)

Then, using a given p-norm, (Condition 1) above is assessed.

In this manner, the wireless communication system 100 according to the present embodiment determines whether (Condition 1) is met or not, and if (Condition 1) is met, can determine the transmit weight matrix W(z) for the linear equalizer and remove inter-symbol interference and inter-stream interference.

As described in the prior art, when the determinant det(H(z)) of the transfer function matrix H(z) for CIR is in a non-minimum phase, the filter tap coefficients of the FIR filter will diverge, so that it is not possible to remove inter-symbol interference and inter-stream interference with the FIR filter. However, the wireless communication system 100 according to the present embodiment can remove inter-symbol interference and inter-stream interference with an FIR filter even when det(H(z)) is in a non-minimum phase in the case where (Condition 1) is met.

[Variant]

As mentioned above, the transmit weight matrix W(z) may be computed based only on (Condition 1) and inter-symbol interference and inter-stream interference may be removed. However, when (Condition 1) is not met, inter-symbol interference and inter-stream interference cannot be removed, thus necessitating suspension of a transmission process or handling such as changing antenna arrangement or the antenna combination being used.

Accordingly, the present variant adds a condition from Non-Patent Literature 1 (referred to as (Condition 2)), and if (Condition 1) is not met, determines whether (Condition 2) is met or not and computes the transmit weight matrix W(z) by Expression (1) described in the prior art if (Condition 2) is met.

In this manner, the wireless communication system 100 according to the present variant covers a portion to which the (Condition 1) described in the first embodiment is not applicable with (Condition 2) and covers a portion to which (Condition 2) is not applicable with (Condition 1). Thus, the application condition for propagation path characteristics with which removal of inter-symbol interference and inter-stream interference is correctly performed can be expanded.

(Specific Example of 2×2 MIMO)

Here, (Condition 1) and (Condition 2) are described by giving a specific example of a 2×2 MIMO case. Note that for the sake of simplicity, an example of assuming a delayed wave path between antennas as a two-wave model in 2×2 MIMO arrangement is shown.

(Case of Condition 1)

First, a specific example of (Condition 1) in 2×2 MIMO is described. (Condition 1) in 2×2 MIMO is that any p-norm of Expression (12) is less than 1 as described earlier.

[Math. 13]

[Math. 13]

$$H^{(0)-1}H^{(L)} = \frac{1}{h_{11}^{(0)}h_{22}^{(0)} - h_{21}^{(0)}h_{12}^{(0)}}\begin{bmatrix} h_{11}^{(L)}h_{22}^{(0)} - h_{12}^{(0)}h_{21}^{(L)} & h_{12}^{(L)}h_{22}^{(0)} - h_{12}^{(0)}h_{22}^{(L)} \\ h_{11}^{(0)}h_{21}^{(L)} - h_{11}^{(L)}h_{21}^{(0)} & h_{11}^{(0)}h_{22}^{(L)} - h_{12}^{(L)}h_{21}^{(0)} \end{bmatrix} \quad (12)$$

In Expression (12), when p=1 or p=∞, (Condition 2) is met if the condition of Expression (13) or Expression (14) is met, thus allowing the application of the transmit weight matrix W(z) described in Expression (11).

[Math. 14]

[Math. 14]

$$\left\|H^{(0)-1}H^{(l)}\right\|_1 = \max_{1 \leq j \leq 2}\sum_{i=1}^{2}|a_{ij}| < 1 \text{ or} \quad (13)$$

[Math. 15]

$$\left\|H^{(0)-1}H^{(l)}\right\|_\infty = \max_{1 \leq i \leq 2}\sum_{j=1}^{2}|a_{ij}| < 1 \quad (14)$$

where p=1 indicates the maximum of sums of absolute values of components calculated for the respective columns, and p=∞ indicates the maximum of similar sums taken for respective rows.

(Case of Condition 2)

Next, a specific example of (Condition 2) in 2×2 MIMO is described. Expression (15) shows the transfer function matrix H(z) in 2×2 MIMO.

[Math. 16]

$$H(z) = \begin{bmatrix} H_{11}(z) & H_{12}(z) \\ H_{21}(z) & H_{22}(z) \end{bmatrix} \quad (15)$$

In the expression above, each element of H(z) can be represented by Expression (16).

[Math. 17]

$$H_{ij}(z) = h_{ij}^{(0)} + h_{ij}^{(L)}z^{-L} \quad (16)$$

where i is an integer equal to 1 or 2, and j is an integer equal to 1 or 2. Also, $h^{(1)}_{ij}$ indicates the CIR for the l-th path between the i-th receive antenna and the j-th transmit antenna. L is CIR length (equivalent to the number of paths a signal propagates through), and $z^{-1}$ is a delay operator for the transfer function.

Then, it is determined that (Condition 2) is met if det(H(z)) of Expression (17) below is in the minimum phase.

[Math. 18]

$$\det(H(z)) = \left(h_{11}^{(0)}h_{22}^{(0)} - h_{21}^{(0)}h_{12}^{(0)}\right) + \left(h_{11}^{(L)}h_{22}^{(0)} + h_{11}^{(0)}h_{22}^{(L)} - h_{21}^{(L)}h_{12}^{(0)} - h_{21}^{(0)}h_{12}^{(L)}\right)z^{-L} + \left(h_{11}^{(L)}h_{22}^{(L)} - h_{21}^{(L)}h_{12}^{(L)}\right)z^{-2L} \quad (17)$$

Expression (17) will be in the minimum phase if both Expression (18) and Expression (19) below are satisfied.

[Math. 19]

$$\frac{h_{11}^{(L)}h_{22}^{(0)} + h_{11}^{(0)}h_{22}^{(L)} - h_{21}^{(L)}h_{12}^{(0)} - h_{21}^{(0)}h_{12}^{(L)}}{h_{11}^{(0)}h_{22}^{(0)} - h_{21}^{(0)}h_{12}^{(0)}} < 1 \text{ and} \quad (18)$$

[Math. 20]

$$\frac{h_{11}^{(L)}h_{22}^{(L)} - h_{21}^{(L)}h_{12}^{(L)}}{h_{11}^{(0)}h_{22}^{(0)} - h_{21}^{(0)}h_{12}^{(0)}} < 1 \quad (19)$$

In this manner, assessment of (Condition 1) and assessment of (Condition 2) can be made in 2×2 MIMO.

First Embodiment

Figure 3:
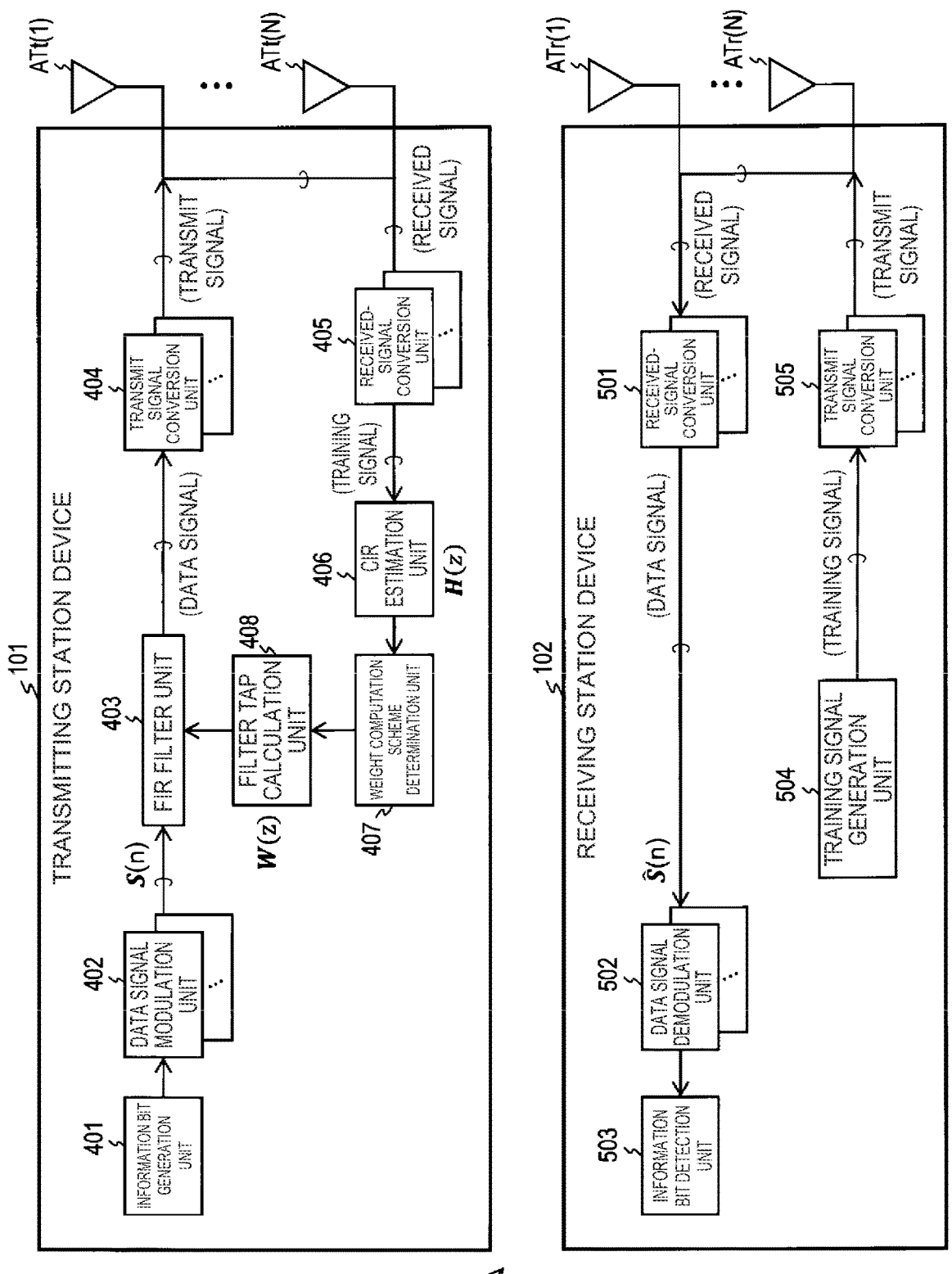
FIG. 3 shows an example of the transmitting station device and the receiving station device according to a first embodiment.

FIG. 3 shows an example of the transmitting station device 101 and the receiving station device 102 according to the first embodiment. In FIG. 3, the wireless communication system 100 shows an example of detailed configuration of the transmitting station device 101 and the receiving station device 102 of FIG. 2, and performs computation of the transmit weight matrix W(z) according to (Condition 1) or according to (Condition 1) and (Condition 2) as described earlier, and removes inter-symbol interference and inter-stream interference.

In FIG. 3, the transmitting station device 101 includes an information bit generation unit 401, a data signal modulation unit 402, an FIR filter unit 403, a transmit signal conversion unit 404, a received-signal conversion unit 405, a CIR estimation unit 406, a weight computation scheme determination unit 407, a filter tap calculation unit 408, and N antennas from an antenna ATt(1) through an antenna ATt(N). Also in FIG. 3, the receiving station device 102 includes N antennas from an antenna ATr(1) through an antenna ATr(N), a received-signal conversion unit 501, a data signal demodulation unit 502, an information bit detection unit 503, a training signal generation unit 504, and a transmit signal conversion unit 505.

First, the configuration of the transmitting station device 101 is described.

The information bit generation unit 401 generates data information bits to be transmitted to the receiving station device 102. The data information bits are a bit string corresponding to a data signal inputted from outside (not shown), a data signal internally generated and the like, for example. The information bit generation unit 401 divides the data information bits into a number of signal streams as many as the number of antennas ATt, and outputs them to the data signal modulation unit 402. The information bit generation unit 401 may also have an error correction coding feature for generating an error correction code with a predetermined coding rate, an interleaving feature and the like.

The data signal modulation unit 402 outputs a data signal S(n) generated by modulating a bit string for each signal stream outputted by the information bit generation unit 401 by a predetermined modulation scheme (e.g., quadrature amplitude modulation (QAM)). Since in the present embodiment the information bit generation unit 401 outputs data signals which have been modulated for each of signal streams divided according to the number of antennas ATt, the data signal modulation unit 402 is provided for each one stream.

The FIR filter unit 403 outputs to the transmit signal conversion unit 404 a signal generated by removing inter-symbol interference and inter-stream interference from the data signal S(n) outputted by the data signal modulation unit 402 using a filter tap coefficient computed by the filter tap calculation unit 408 discussed later. The FIR filter unit 403 corresponds to a linear equalization unit which performs time-domain linear equalization processing. The FIR filter unit 403 has, for example, delay taps for holding a data signal outputted by the data signal modulation unit 402 and shifting it at certain intervals, and outputs a sum of signals obtained by multiplying the signals from the respective delay taps by a predetermined filter tap coefficient. In this manner, the FIR filter unit 403 performs time-domain linear equalization processing for removing inter-symbol interference and inter-stream interference. The FIR filter unit 403 also performs processing for normalizing transmission power at the same time with the time-domain linear equalization processing.

The transmit signal conversion unit 404 frequency-converts a data signal outputted by the FIR filter unit 403 into a transmit signal of a high frequency for transmission from the antenna ATt. For example, the transmit signal conversion unit 404 up-converts a data signal in 20 MHz band into a high-frequency signal in 5 GHz band and sends it from the antenna ATt. Here, respective ones of multiple divided signal streams are converted into high-frequency signals and sent from the respective ones of the antenna ATt(1) through the antenna ATt(N).

The antennas ATt include N antennas for transmission and reception from the antenna ATt(1) through the antenna ATt(N), and radiates the high-frequency signal outputted by the transmit signal conversion unit 404 into space as an electromagnetic wave. Alternatively, the antennas ATt convert an electromagnetic wave in space transmitted from the receiving station device 102 into high-frequency signals and output them to the received-signal conversion unit 405.

The received-signal conversion unit 405 converts frequency-converts the high-frequency received signals received by the respective ones of the antenna ATt(1) through the antenna ATt(N) into a baseband signal of a low frequency. For example, the received-signal conversion unit 405 down-converts a high-frequency signal in 5 GHz band and outputs a baseband signal in 20 MHz band. Here, in the present embodiment, the received-signal conversion unit 405 receives a training signal from the receiving station device 102 and outputs it to the CIR estimation unit 406.

The CIR estimation unit 406 estimates the CIR based on the training signal transmitted from the receiving station device 102. The CIR estimation unit 406 corresponds to a propagation path characteristics estimation unit for executing propagation path characteristics estimation processing.

The weight computation scheme determination unit 407 determines a computation scheme for the transmit weight matrix W(z) according to (Condition 1) or the combination of (Condition 1) and (Condition 2) as described earlier (corresponding to weight computation scheme determination processing). The weight computation scheme determination unit 407 makes determination only on (Condition 1), and if (Condition 1) is met, selects the computation scheme for the transmit weight matrix W(z) by Expression (11), for example. Alternatively, the weight computation scheme determination unit 407 makes determination according to the combination of (Condition 1) and (Condition 2), and selects the computation scheme for the transmit weight matrix by Expression (11) when (Condition 1) is met, and selects the computation scheme for the transmit weight matrix by Expression (1) described in the prior art when (Condition 1) is not met and (Condition 2) is met.

The filter tap calculation unit 408 calculates filter tap coefficients for use in the FIR filter unit 403 based on the computation scheme for the transmit weight matrix W(z) determined by the weight computation scheme determination unit 407 and outputs them to the =IR filter unit 403 (corresponding to filter tap calculation processing).

In this manner, the transmitting station device 101 can transmit data signals from which inter-symbol interference and inter-stream interference have been removed by the FIR filter unit 403 to the receiving station device 102.

Next, the configuration of the receiving station device 102 shown in FIG. 3 is described.

The antennas ATr include N antennas for transmission and reception: the antenna ATr(1) through the antenna ATr(N), and radiate a high-frequency signal outputted by the transmit signal conversion unit 505 discussed later into space as an electromagnetic wave. Alternatively, the antennas ATr convert an electromagnetic wave in space transmitted from the transmitting station device 101 into high-frequency signals and outputs them to the received-signal conversion unit 501 discussed later.

The received-signal conversion unit 501 frequency-converts the high-frequency signals received from the respective ones of the antenna ATr(1) through the antenna ATr(N) into a baseband signal, as with the received-signal conversion unit 405 of the transmitting station device 101. Here, data signals received from the transmitting station device 101 are outputted to the data signal demodulation unit 502.

The data signal demodulation unit 502 demodulates the data signal S/\(n) outputted by the received-signal conversion unit 501 into information bits and outputs a bit string. Since the received-signal conversion unit 501 outputs the data signal for multiple streams according to the number of antennas ATr, the multiple data signal demodulation unit 502 demodulates the data signal for each stream respectively. Then, the data signal demodulation unit 502 outputs a bit string formed by concatenating bit strings that have been divided into multiple streams on the transmitting station device 101 side to the information bit detection unit 503. The data signal demodulation unit 502 may have an error correction decoding feature and/or a deinterleaving feature as appropriate for the functionality of the transmitting station device 101 side.

The information bit detection unit 503 outputs received data generated by converting the bit string outputted by the data signal demodulation unit 502 into digital data. An error correction decoding feature and/or a deinterleaving feature may be implemented on the information bit detection unit 503 side.

The training signal generation unit 504 generates a training signal for the CIR estimation unit 406 of the transmitting station device 101 to estimate the CIR (corresponding to training signal generation processing). The training signal is a predetermined signal generated by modulating a predefined information, such as a preamble for signal detection (e.g., a specific pattern such as an alternating pattern of "01"), with a modulation scheme resistant to interference such as PSK (Phase Shift Keying), and is used for estimating the CIR on the transmitting station device 101 side. Information on the training signal which is transmitted by the receiving station device 102 is known by the transmitting station device 101 in advance.

The transmit signal conversion unit 505 converts the training signal outputted by the training signal generation unit 504 into a high-frequency signal and sends it from the antennas ATr.

In this manner, the receiving station device 102 can transmit the training signal for estimating the CIR on the transmitting station device 101 side and receive data signal transmitted from the transmitting station device 101 in which inter-symbol interference and inter-stream interference have been equalized.

Second Embodiment

Figure 4:
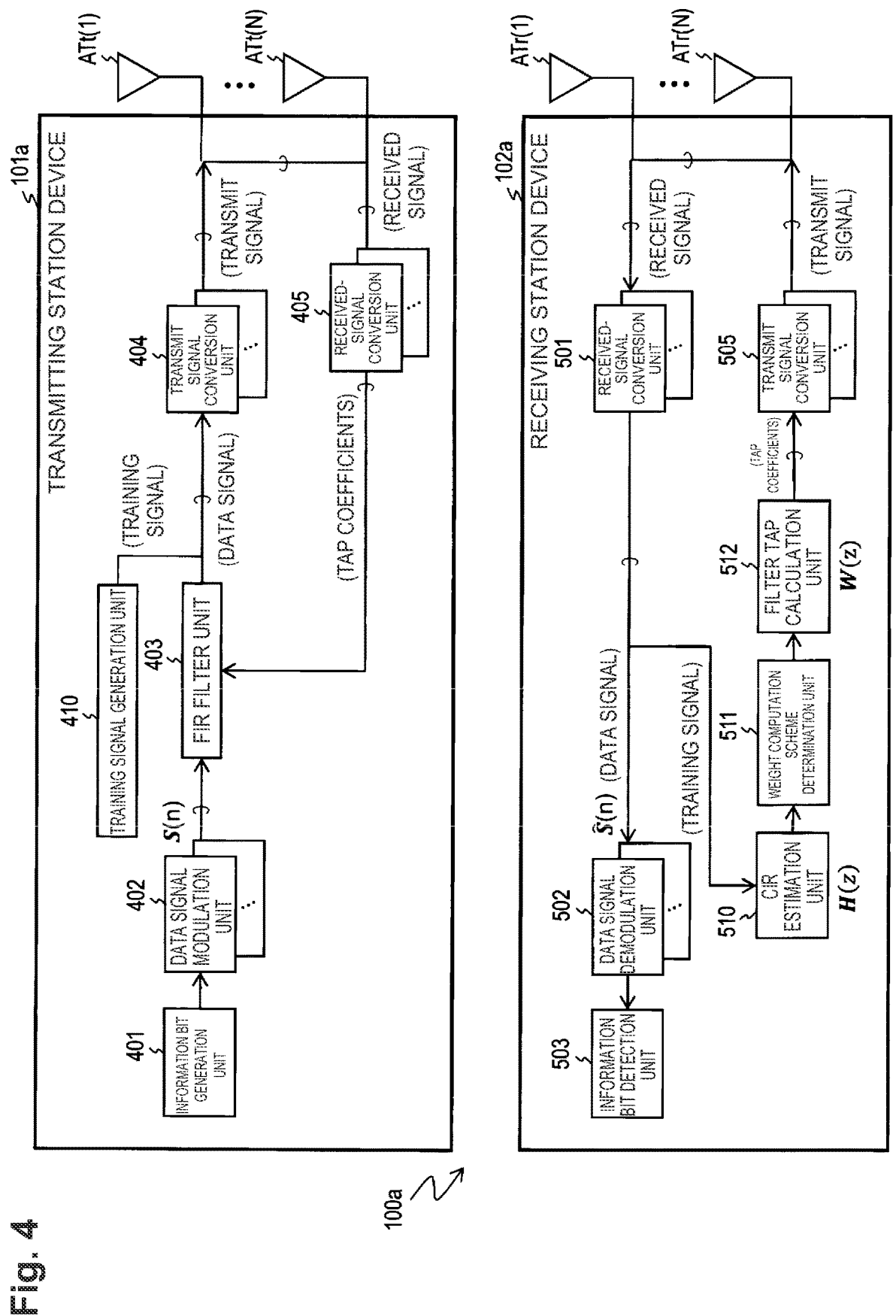
FIG. 4 shows an example of the transmitting station device and the receiving station device according to a second embodiment.
Figure 6:
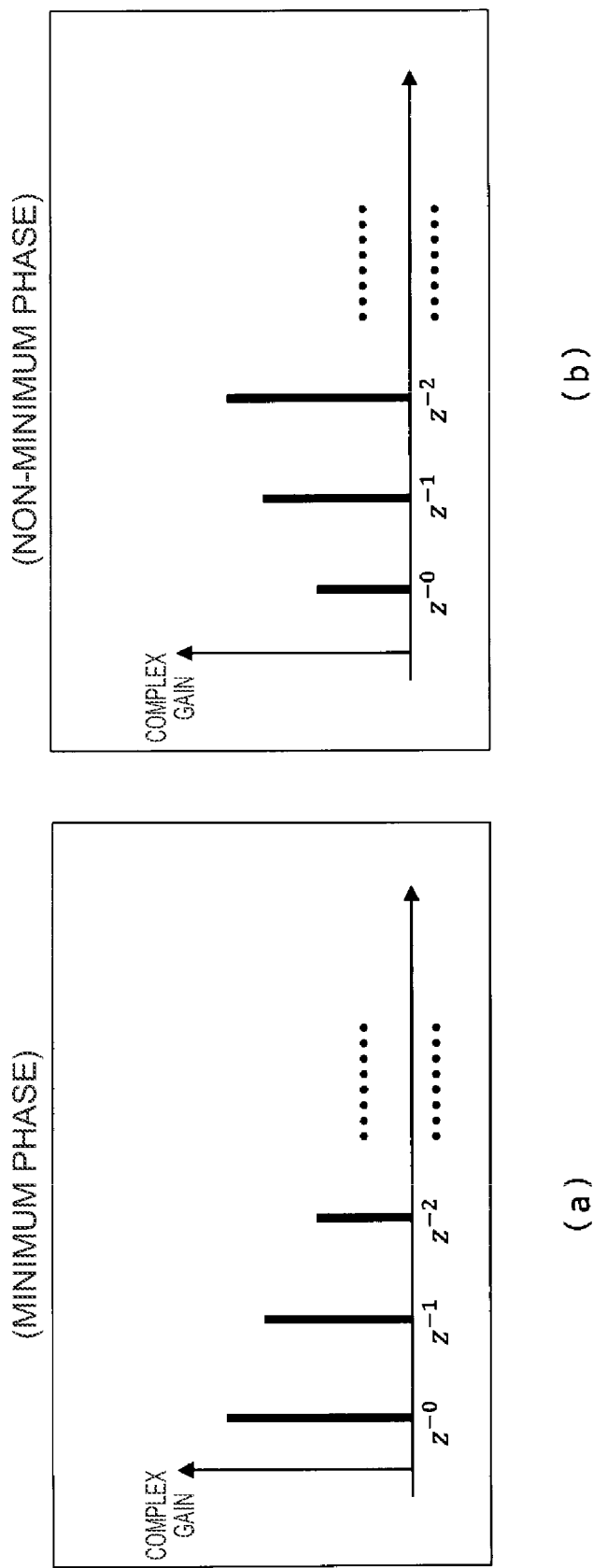
FIG. 6 shows an example of filter tap coefficients when det (Hz) is in a minimum phase versus in a non-minimum phase.

FIG. 4 shows an example of a transmitting station device 101a and a receiving station device 102a according to the second embodiment. Here, the wireless communication system 100a shown in FIG. 4 is different from the wireless communication system 100 described in FIG. 6 in the following two respects. A first difference is that the receiving station device 102a transmits the training signal. A second difference is that the receiving station device 102a estimates the CIR, calculates the filter tap coefficients for the FIR filter unit 403 of the transmitting station device 101a, and transmits them to the transmitting station device 101a. In FIG. 4, the blocks with the same reference signs as in FIG. 3 perform similar processing to those in FIG. 3.

In FIG. 4, the transmitting station device 101a includes an information bit generation unit 401, a data signal modulation unit 402, an FIR filter unit 403, a transmit signal conversion unit 404, a received-signal conversion unit 405, a training signal generation unit 410, and N antennas from an antenna ATt(1) through an antenna ATt(N). The information bit generation unit 401, the data signal modulation unit 402, the FIR filter unit 403, the transmit signal conversion unit 404 and the received-signal conversion unit 405 operate in a similar manner to the blocks with the same reference signs in FIG. 3.

The training signal generation unit 410 operates in a similar manner to the training signal generation unit 504 of the receiving station device 102 described in the first embodiment, converts a generated training signal to a high-frequency signal at the transmit signal conversion unit 404 and transmits it from the antennas ATt. Note that transmission of the training signal takes place prior to transmission of the data signal outputted from the FIR filter unit 403.

Here, while in the first embodiment the received-signal conversion unit 405 receives the training signal transmitted from the receiving station device 102 via the antennas ATt and outputs it to the CIR estimation unit 406, in the second embodiment, the received-signal conversion unit 405 receives a signal containing information on filter tap coefficients transmitted from the receiving station device 102a via the antennas ATt and outputs it to the FIR filter unit 403.

In this manner, the transmitting station device 101a can transmit a training signal for estimating the CIR on the receiving station device 102a side, set the filter tap coefficients calculated by the receiving station device 102a in the FIR filter unit 403, and transmit data signals with inter-symbol interference and inter-stream interference equalized.

In FIG. 4, the receiving station device 102a includes N antennas from the antenna ATr(1) through the antenna ATr(N), a received-signal conversion unit 501, a data signal demodulation unit 502, an information bit detection unit 503, a transmit signal conversion unit 505, a CIR estimation unit 510, a weight computation scheme determination unit 511, and a filter tap calculation unit 512. The received-signal conversion unit 501, the data signal demodulation unit 502, the information bit detection unit 503 and the transmit signal conversion unit 505 operate in a similar manner to the blocks with the same reference signs in FIG. 3.

The CIR estimation unit 510 operates in a similar manner to the CIR estimation unit 406 in the first embodiment and estimates the CIR based on the training signal transmitted from the transmitting station device 101a.

The weight computation scheme determination unit 511 operates in a similar manner to the weight computation scheme determination unit 407 in the first embodiment and determines the computation scheme for the transmit weight matrix W(z) according to (Condition 1) or the combination of (Condition 1) and (Condition 2) as described earlier.

The filter tap calculation unit 512 operates in a similar manner to the filter tap calculation unit 408 in the first embodiment and calculates the filter tap coefficients for use in the FIR filter unit 403 of the transmitting station device 101a by the computation scheme for the transmit weight matrix W(z) determined by the weight computation scheme determination unit 511. Then, the filter tap calculation unit 512 transmits the calculated filter tap coefficients to the transmitting station device 101a via the transmit signal conversion unit 505 and the antennas ATr.

In this manner, the receiving station device 102a estimates the CIR with the training signal transmitted from the transmitting station device 101a. The receiving station device 102a also calculates filter tap coefficients for equalizing inter-symbol interference and inter-stream interference at the FIR filter unit 403 of the transmitting station device 101a and transmits them to the transmitting station device 101a. This enables the transmitting station device 101a to transmit data signals with inter-symbol interference and inter-stream interference equalized.

Processing Method in the First Embodiment and the Second Embodiment

Figure 5:
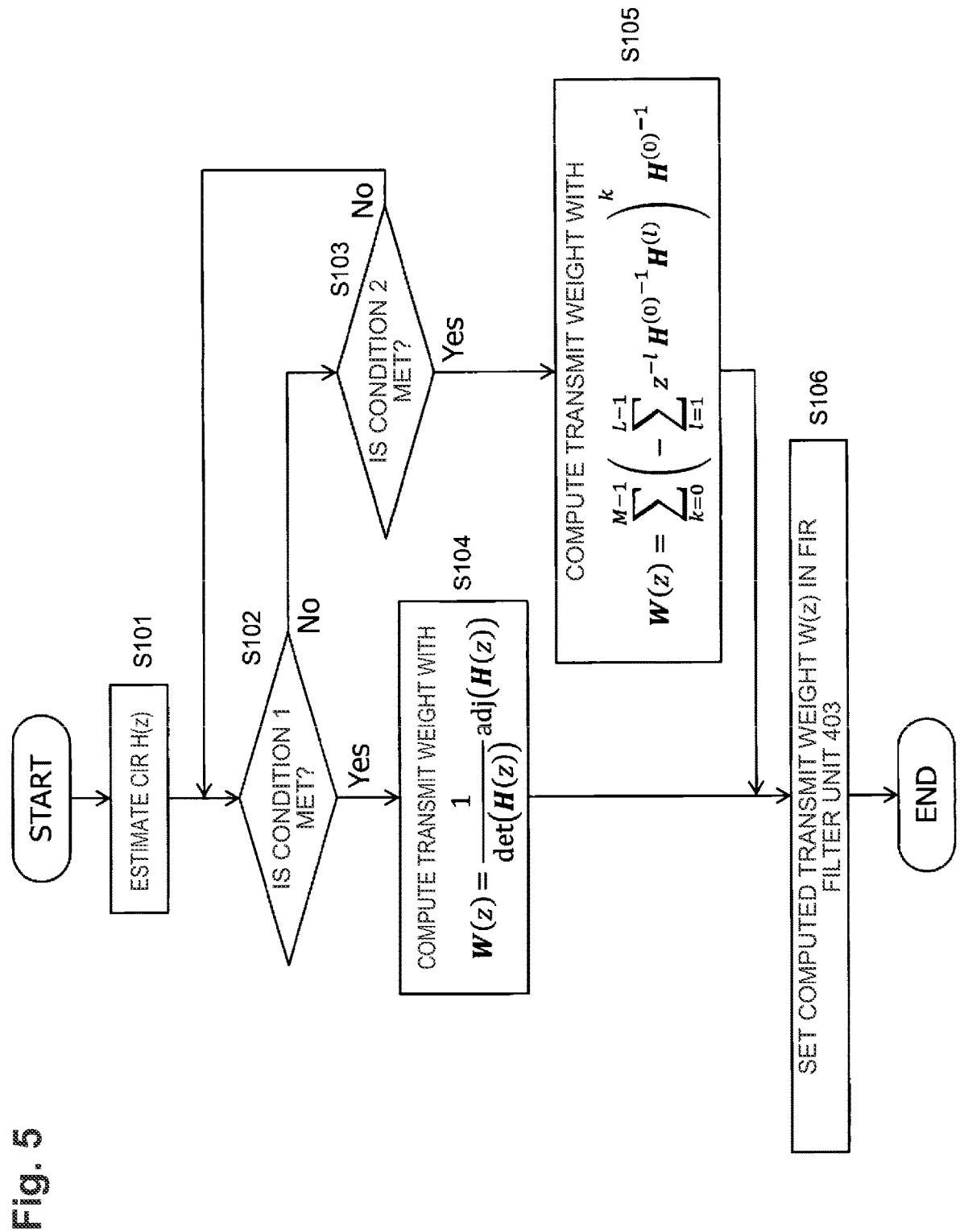
FIG. 5 shows an example of processing performed by the wireless communication system according to the first embodiment or the wireless communication system according to the second embodiment.

FIG. 5 shows an example of processing performed by the wireless communication system 100 according to the first embodiment or the wireless communication system 100a according to the second embodiment. The process shown in FIG. 5 is executed by the components of the transmitting station device 101 and the receiving station device 102 shown in FIG. 3 or the transmitting station device 101a and the receiving station device 102a shown in FIG. 4.

In step S101, the CIR estimation unit 406 (or the CIR estimation unit 510) receives a training signal transmitted from the receiving station device 102a (or the transmitting station device 101a) and estimates the CIR.

In step S102, the weight computation scheme determination unit 407 (or the weight computation scheme determination unit 511) determines whether (Condition 1) is met or not, and proceeds to processing in step S104 when (Condition 1) is met and to processing in step S103 when (Condition 1) is not met.

In step S103, the weight computation scheme determination unit 407 (or the weight computation scheme determination unit 511) determines whether (Condition 2) is met or not, and proceeds to processing in step S105 when (Condition 2) is met and returns to the processing in step S102 when (Condition 2) is not met.

In step S104, the filter tap calculation unit 408 (or the filter tap calculation unit 512) computes filter tap coefficients based on the transmit weight matrix W(z) of Expression (11) described earlier and proceeds to processing in step S106.

In step S105, the filter tap calculation unit 408 (or the filter tap calculation unit 512) computes filter tap coefficients based on the transmit weight matrix W(z) of Expression (1) described in the prior art.

In step S106, the filter tap calculation unit 408 (or the filter tap calculation unit 512) sets the filter tap coefficients computed at step S104 or step S105 in the FIR filter unit 403.

Here, without performing the determination processing for (Condition 2) in step S103 and the processing in step S105, only the determination processing for (Condition 1) in step S102 may be performed, and then processing in step S104 may be performed if (Condition 1) is met or the flow may return to the processing in step S102 if (Condition 1) is not met.

In this manner, the wireless communication system 100 according to the first embodiment and the wireless communication system 100a according to the second embodiment can determine the weight computation scheme based on the CIR estimated from the training signal and determine filter tap coefficients usable in the =IR filter unit 403. This allows processing for removing inter-symbol interference and inter-stream interference to be implemented by the FIR filter unit 403.

As has been described in the respective embodiments, the wireless communication system, wireless communication method, transmitting station device and the receiving station device according to the present invention can remove inter-symbol interference and inter-stream interference with a time-domain linear equalizer even when the determinant of the transfer function matrix for the CIR H(z) is in a non-minimum phase in SC-MIMO transmission.

REFERENCE SIGNS LIST 100, 100a wireless communication system
101, 101a transmitting station device
102, 102a receiving station device
201 QAM modulation unit
202 linear equalization unit
203, 301 RM unit
302 QAM demodulation unit
401 information bit generation unit
402 data signal modulation unit
403 FIR filter unit
404, 505 transmit signal conversion unit
405, 501 received-signal conversion unit
406, 510 CIR estimation unit
407, 511 weight computation scheme determination unit
408, 512 filter tap calculation unit
410, 504 training signal generation unit
502 data signal demodulation unit
503 information bit detection unit
ATt, ATr antenna

The invention claimed is:

1. A wireless communication system that performs single carrier MIMO transmission between a transmitting station device and a receiving station device, comprises:
   the transmitting station device comprising:
   a time-domain linear equalization unit configured to remove inter-symbol interference and inter-stream interference from a data signal to be transmitted to the receiving station device;
   a propagation path characteristics estimation unit configured to receive a training signal which is transmitted by the receiving station device and estimate a transfer function matrix of propagation path characteristics; and
   a filter tap calculation unit configured to calculate filter tap coefficients for the time-domain linear equalization unit by representing the estimated transfer function matrix as a matrix polynomial, taking an inverse response of the matrix polynomial as a transmit weight matrix, and approximating the transmit weight matrix with Neumann series, and
   the receiving station device comprising:
   a training signal generation unit configured to generate the training signal for use in estimation of propagation path characteristics and transmit the training signal to the transmitting station device.

2. The wireless communication system according to claim 1, wherein the transmitting station device further comprises a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

3. A wireless communication system that performs single carrier MIMO transmission between a transmitting station device and a receiving station device, comprises:

the transmitting station device comprising:

a time-domain linear equalization unit configured to remove inter-symbol interference and inter-stream interference from a data signal to be transmitted to the receiving station device; and a training signal generation unit configured to generate a training signal for use in estimation of propagation path characteristics and transmit the training signal to the receiving station device, and the receiving station device comprising:

a propagation path characteristics estimation unit configured to receive the training signal transmitted by the transmitting station device and estimate a transfer function matrix of propagation path characteristics; and a filter tap calculation unit configured to calculate filter tap coefficients for the time-domain linear equalization unit by representing the estimated transfer function matrix as a matrix polynomial, taking an inverse response of the matrix polynomial as a transmit weight matrix, and approximating the transmit weight matrix with Neumann series, and to transmit the filter tap coefficients to the transmitting station device.

4. The wireless communication system according to claim 3, wherein the receiving station device further comprises a weight computation scheme determination unit configured to assess a condition on whether approximation of the transmit weight matrix with the Neumann series is possible or not, and when the condition is not met, to make the filter tap calculation unit calculate the filter tap coefficients by a different method than approximation with the Neumann series.

5. A wireless communication method in a wireless communication system that performs single carrier MIMO transmission between a transmitting station device and a receiving station device, comprises:

the transmitting station device performing:

time-domain linear equalization processing for removing inter-symbol interference and inter-stream interference from a data signal to be transmitted to the receiving station device;

propagation path characteristics estimation processing for receiving a training signal which is transmitted by the receiving station device and estimating a transfer function matrix of propagation path characteristics; and filter tap calculation processing for calculating filter tap coefficients for the time-domain linear equalization processing by representing the estimated transfer function matrix as a matrix polynomial, taking an inverse response of the matrix polynomial as a transmit weight matrix, and approximating the transmit weight matrix with Neumann series, and the receiving station device performing:

training signal generation processing for generating the training signal for use in estimation of propagation path characteristics and transmitting the training signal to the transmitting station device.

6. The wireless communication method according to claim 5, wherein the transmitting station device further performs weight computation scheme determination processing for assessing a condition on whether approximation of the transmit weight matrix with the Neumann series is possible or not, and when the condition is not met, for making the filter tap calculation processing calculate the filter tap coefficients by a different method than approximation with the Neumann series.

* * * * *